(12) United States Patent
Mizukami et al.

(10) Patent No.: US 11,179,889 B2
(45) Date of Patent: Nov. 23, 2021

(54) THREE-DIMENSIONAL FORMING SYSTEM, DATA GENERATING APPARATUS, METHOD OF GENERATING DATA, AND PROGRAM

(71) Applicant: Seiko Epson Corporation, Tokyo (JP)

(72) Inventors: Shunsuke Mizukami, Hokuto (JP); Satoshi Yamazaki, Matsumoto (JP); Kazuhide Nakamura, Asahi (JP); Kohei Yuwaki, Shiojiri (JP); Koichi Saito, Matsumoto (JP)

(73) Assignee: Seiko Epson Corporation

( * ) Notice: Subject to any disclaimer, the term of this patent is extended or adjusted under 35 U.S.C. 154(b) by 388 days.

(21) Appl. No.: 16/354,355

(22) Filed: Mar. 15, 2019

(65) Prior Publication Data

US 2019/0283320 A1    Sep. 19, 2019

(30) Foreign Application Priority Data

Mar. 16, 2018  (JP) .............................. JP2018-048759

(51) Int. Cl.
| | | |
|---|---|---|
| B29C 64/209 | (2017.01) | |
| B29C 64/393 | (2017.01) | |
| B29C 64/153 | (2017.01) | |
| B33Y 50/00 | (2015.01) | |
| B29C 64/106 | (2017.01) | |
| B33Y 10/00 | (2015.01) | |

(Continued)

(52) U.S. Cl.
CPC .......... B29C 64/209 (2017.08); B29C 64/153 (2017.08); B29C 64/393 (2017.08); *B33Y 10/00* (2014.12); *B33Y 30/00* (2014.12); *B33Y 50/02* (2014.12)

(58) Field of Classification Search
CPC ... B29C 64/209; B29C 64/393; B29C 64/153; B29C 64/106; B29C 64/112; B29C 64/20; B29C 64/386; B33Y 10/00; B33Y 30/00; B33Y 50/02; B33Y 50/00
USPC .......................................................... 700/117
See application file for complete search history.

(56) References Cited

U.S. PATENT DOCUMENTS

| | | | |
|---|---|---|---|
| 5,182,715 A | | 1/1993 | Vorgitch et al. |
| 2018/0068774 A1* | | 3/2018 | Wang ................. H01F 41/0246 |
| 2019/0125681 A1* | | 5/2019 | Albed Alhnan ...... B29C 64/209 |

FOREIGN PATENT DOCUMENTS

| | | |
|---|---|---|
| CN | 106926444 A | 7/2017 |
| JP | H04-091929 A | 3/1992 |

* cited by examiner

*Primary Examiner* — Michael J Brown
(74) *Attorney, Agent, or Firm* — Harness, Dickey & Pierce, P.L.C.

(57) ABSTRACT

A three-dimensional forming system includes a three-dimensional forming apparatus and a control device. The three-dimensional forming apparatus includes a nozzle that discharges a forming material, an opening/closing mechanism that opens or closes a flow path connected to the nozzle, a moving mechanism that changes a relative position between the forming table and the nozzle, and a control unit that perform a control based on forming data. The control device includes a forming data generating unit that analyzes path data including a path indicating a movement direction and a movement distance of the nozzle and a discharge parameter indicating discharging of the forming material, generates the forming data by adding an opening/closing command for driving the opening/closing mechanism to the path data, and transmits the forming data to the three-dimensional forming apparatus.

7 Claims, 8 Drawing Sheets

(51) Int. Cl.
*B33Y 30/00* (2015.01)
*B33Y 50/02* (2015.01)

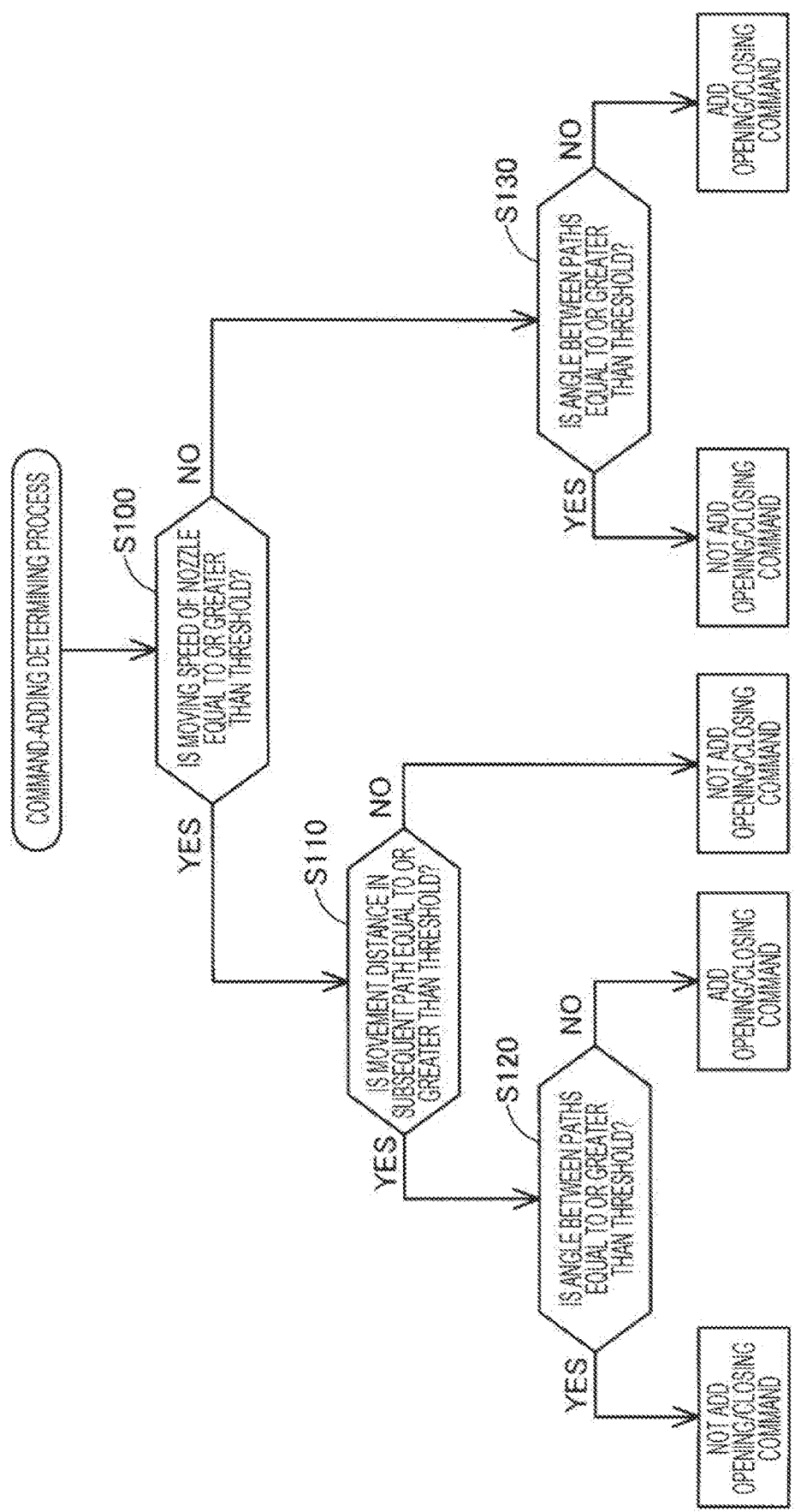

the entire disclosure of which is expressly incor-
porated by reference herein.

THREE-DIMENSIONAL FORMING SYSTEM, DATA GENERATING APPARATUS, METHOD OF GENERATING DATA, AND PROGRAM

This application claims priority under 35 U.S.C. § 119 to Japanese Patent Application No. 2018-048759 filed on Mar. 16, 2018, the entire disclosure of which is expressly incorporated by reference herein.

BACKGROUND

1. Technical Field

The present invention relates to a forming technique of a three-dimensional formed object.

2. Related Art

For example, JP-A-4-91929 discloses a three-dimensional forming system that forms a three-dimensional formed object by irradiating a photo-curable resin with a beam to cure the resin. In the three-dimensional forming system of JP-A-4-91929, a three-dimensional forming apparatus is caused to form the three-dimensional formed object based on data obtained by converting three-dimensional computer-aided design (CAD) data into an appropriate format. As described above, generally, in the three-dimensional forming system, forming data suitable for the configuration of the three-dimensional forming apparatus is generated from the three-dimensional CAD data, and the three-dimensional forming apparatus is caused to form the three-dimensional formed object in according to corresponding forming data.

The three-dimensional forming system includes the three-dimensional forming apparatus for forming the three-dimensional formed object by discharging a forming material from a nozzle to a forming table. In such a three-dimensional forming apparatus, for example, in order to have a configuration for controlling the discharging of the forming material from the nozzle, there is a case in which a modification is made to newly add an opening/closing mechanism which opens or closes a flow path of the forming material connected to the nozzle. In the three-dimensional forming system, even when the modification is made to the three-dimensional forming apparatus, it is desirable that forming data that be suitable for the three-dimensional forming apparatus after the modification and can efficiently operate the added opening/closing mechanism can be easily generated.

SUMMARY

An advantage of some aspects of the invention is to provide a three-dimensional forming system including a control device and a three-dimensional forming apparatus. The three-dimensional forming apparatus includes a nozzle that discharges a forming material toward a forming table, an opening/closing mechanism that opens or closes a flow path connected to the nozzle; a moving mechanism that changes a relative position between the forming table and the nozzle; and a control unit that controls the opening/closing mechanism and the moving mechanism according to forming data. The control device includes a forming data generating unit that analyzes path data including a path indicating a relative movement direction and a movement distance of the nozzle with respect to the forming table and a discharge parameter indicating discharging of the forming material, generates the forming data by adding an opening/closing command for driving the opening/closing mechanism to the path data, and transmits the forming data to the three-dimensional forming apparatus.

BRIEF DESCRIPTION OF THE DRAWINGS

The invention will be described with reference to the accompanying drawings, wherein like numbers reference like elements.

FIG. 9 is an explanatory diagram illustrating the flow of a command-adding determining process.

DESCRIPTION OF EXEMPLARY EMBODIMENTS

1. First Embodiment

1-1. Schematic Configuration of Three-Dimensional Forming System

Figure 1:
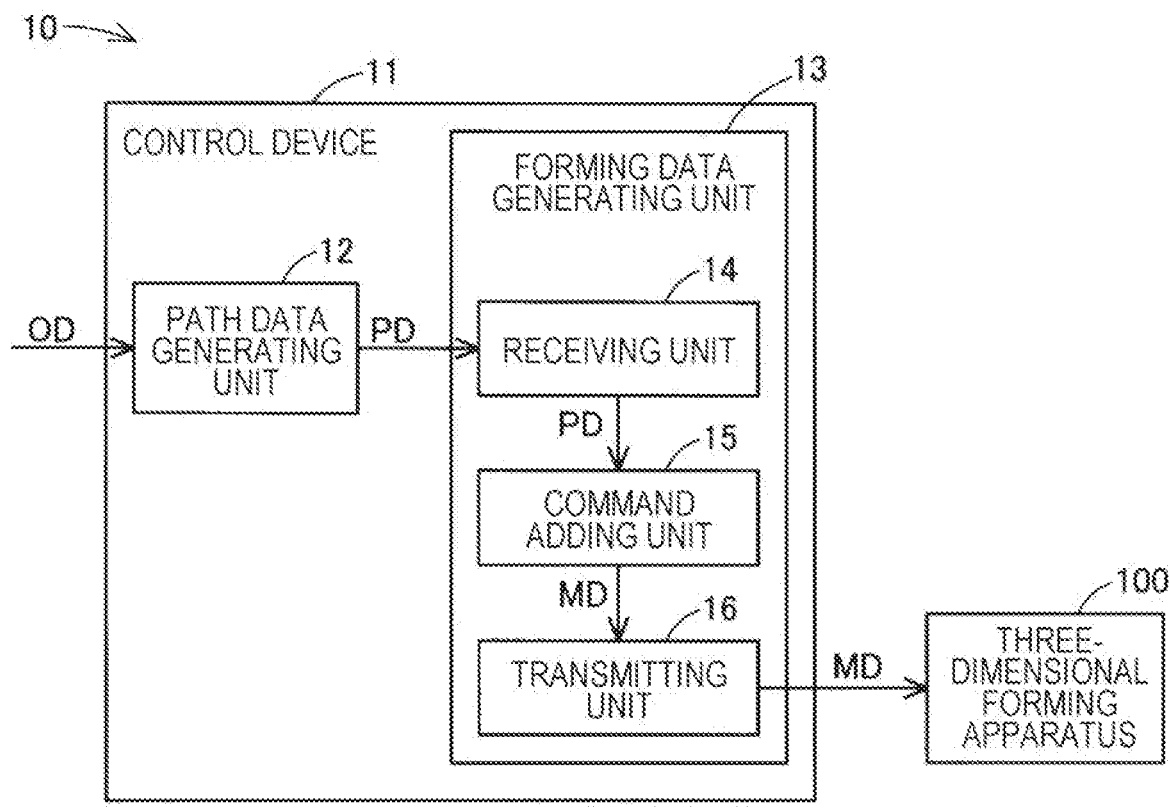
FIG. 1 is a schematic block diagram illustrating the configuration of a three-dimensional forming system.

FIG. 1 a schematic block diagram illustrating the configuration of a three-dimensional forming system 10 in a first embodiment. The three-dimensional forming system 10 includes a three-dimensional forming apparatus 100. The three-dimensional forming system 10 causes the three-dimensional forming apparatus 100 to form a three-dimensional formed object based on original data OD representing the shape of the three-dimensional formed object. In the embodiment, the original data OD is three-dimensional CAD data created by three-dimensional CAD software. Hereinafter, "the three-dimensional forming system", "the three-dimensional forming apparatus", "the three-dimensional formed object", and "the three-dimensional CAD data" will be referred to as simply "the forming system", "the forming apparatus", "the formed object", and "the CAD data", respectively. The configuration of the three-dimensional forming apparatus 100 will be described later.

The three-dimensional forming system 10 further includes a control device 11. The control device 11 is constituted by a computer including one or a plurality of processors and a main memory device. The control device 11 performs various functions by the processor executing programs or instructions read in the main memory device. In another embodiment, the control device 11 may be implemented by a configuration in which a plurality of circuits for implementing each function are combined instead of configuring the control device 11 using a computer.

The control device 11 transmits forming data MD generated from the original data OD to the forming apparatus 100. The control device 11 includes a path data generating unit 12 and a forming data generating unit 13. In the embodiment, the path data generating unit 12 and the forming data generating unit 13 are functional units that are implemented by a program executed in a computer which constitutes the control device 11.

The path data generating unit 12 has a function of receiving input of the original data OD from the outside of the control device 11 and generating path data PD from the original data OD. The path data generating unit 12 outputs the generated path data PD to the forming data generating unit 13. The path data PD will be described after describing the configuration of the forming apparatus 100.

The forming data generating unit 13 executes a data generating process for generating the forming data MD from the path data PD. The forming data generating unit 13 includes a receiving unit 14, a command adding unit 15, and a transmitting unit 16. The receiving unit 14 receives input of the path data PD from the path data generating unit 12. The receiving unit 14 outputs the path data PD to the command adding unit 15.

The command adding unit 15 analyzes the content of the path data PD. Based on the result of analyzing, the command adding unit 15 adds an opening/closing command to the path data PD to generate the forming data MD. The transmitting unit 16 transmits the generated forming data MD to the forming apparatus 100. The data generating process, the analysis of the path data PD by the command adding unit 15, the opening/closing command added by the command adding unit 15, and the forming data MD will be described later.

Figure 2:
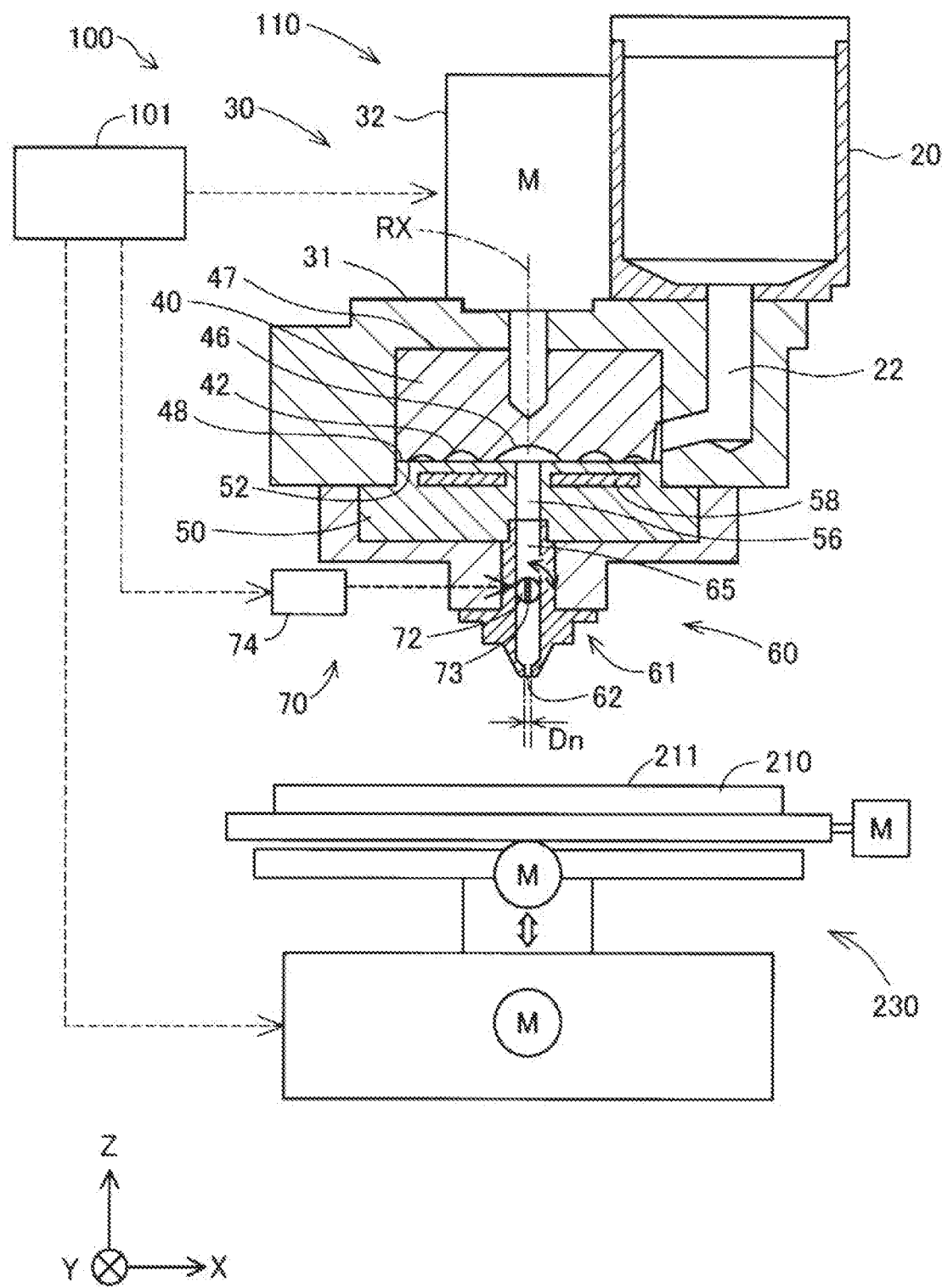
FIG. 2 is a schematic diagram illustrating the configuration of a three-dimensional forming apparatus.

1-2. Schematic Configuration of Three-Dimensional Forming Apparatus 1-2-1. Overall Configuration of Three-Dimensional Forming Apparatus FIG. 2 is a schematic diagram illustrating the configuration of the forming apparatus 100. In FIG. 2, arrows are depicted indicating X, Y, and Z directions which orthogonally intersect each other. In the embodiment, the X direction and the Y direction are directions which are parallel to a horizontal plane, and the Z direction is an opposite direction from a gravity direction (a plumb direction). The arrows indicating the X, Y, and Z directions are also depicted, as appropriate, in other reference drawings such that the depicted directions correspond to those of FIG. 2.

The forming apparatus 100 forms the three-dimensional formed object using the forming material. "The forming material" will be described later. The forming apparatus 100 is provided with a control unit 101, a forming unit 110, a forming table 210, and a moving mechanism 230.

The control unit 101 controls the overall operation of the forming apparatus 100 according to forming data MD received from the control device 11, and executes a forming process which forms the formed object. In the embodiment, the control unit 101 is configured by a computer which is provided with one or a plurality of the processors and the main memory device. The control unit 101 performs various functions by the processor executing programs or commands read on the main memory device. The control unit 101 may be implemented by a configuration in which a plurality of circuits for implementing each function are combined instead of configuring the control unit 101 using the computer.

The forming unit 110 disposes a forming material, which is obtained by melting at least a portion of a material in a solid state to render the material paste form, on the forming table 210. The forming unit 110 is provided with a material supply unit 20, a forming material generating unit 30, and a discharging unit 60.

The material supply unit 20 supplies the material to the forming material generating unit 30. The material supply unit 20 is configured by a hopper which stores the material, for example. The material supply unit 20 includes a discharge port on the bottom of the material supply unit 20. The discharge port is connected to the forming material generating unit 30 via a communicating path 22. The material is inserted into the material supply unit 20 in a state of pellets, a powder, or the like. The material to be input into the material supply unit 20 will be described later.

The forming material generating unit 30 generates a fluid paste-form forming material which is obtained by melting at least a portion of a material which is supplied from the material supply unit 20 and guides the forming material to the discharging unit 60. The forming material generating unit 30 includes a screw case 31, a drive motor 32, a flat screw 40, and a screw surface facing portion 50.

The flat screw 40 has a substantially columnar shape in which the height in the axial direction, which is a direction along the center axis, is smaller than the diameter. The flat screw 40 is disposed such that the axial direction is parallel to the Z direction and the flat screw 40 rotates along a circumferential direction. In the embodiment, the center axis of the flat screw 40 matches a rotational axis RX of the flat screw 40. In FIG. 2, the rotational axis RX of the flat screw 40 is depicted using a dot-dash line.

The flat screw 40 is stored inside the screw case 31. A top surface 47 side of the flat screw 40 is connected to the drive motor 32 and the flat screw 40 rotates inside the screw case 31 due to a rotational driving force which is generated by the drive motor 32. The drive motor 32 is driven under the control of the control unit 101.

In the flat screw 40, groove portions 42 are formed in a bottom surface 48 which is a surface which intersects the rotational axis RX. The communicating path 22 of the material supply unit 20 which is described above is connected to the groove portions 42 from the side surface of the flat screw 40.

The bottom surface 48 of the flat screw 40 faces a top surface 52 of the screw surface facing portion 50 and a space is formed between the groove portions 42 of the bottom surface 48 of the flat screw 40 and the top surface 52 of the screw surface facing portion 50. In the forming unit 110, the material is supplied from the material supply unit 20 in the space between the flat screw 40 and the screw surface facing portion 50. A description will be given later of the specific configuration of the flat screw 40 and the groove portions 42.

A heater 58 for heating the material is embedded in the screw surface facing portion 50. At least a portion of the material which is supplied into the groove portions 42 of the flat screw 40 which is rotating flows along the groove portions 42 while being melted and is guided to a center portion 46 of the flat screw 40 according to the rotation of the flat screw 40. The paste-form material which flows into the center portion 46 is supplied to the discharging unit 60 as the forming material via a communicating hole 56 which is provided in the center of the screw surface facing portion 50.

The discharging unit 60 includes a nozzle 61, a flow path 65, and an opening/closing mechanism 70. The nozzle 61 is connected to the communicating hole 56 of the screw surface facing portion 50 through the flow path 65. The flow path 65 is a flow path of the forming material between the flat screw 40 and the nozzle 61. The nozzle 61 discharges the forming material which is generated in the forming material generating unit 30 toward the forming table 210 from a discharge port 62 of the tip of the nozzle 61.

The discharge port 62 of the nozzle 61 has a bore diameter Dn. The bore diameter Dn of the nozzle 61 is a maximum value of the width of the opening of the discharge port 62 in a scanning direction of the nozzle 61. "the scanning direction of the nozzle 61" is the direction in which the position of the nozzle 61 relatively moves with respect to the forming table 210 while the nozzle 61 discharges the forming material. In the embodiment, the discharge port 62 has a regular circular shape, and the bore diameter Dn corresponds to the diameter of the discharge port 62. Here, the discharge port 62 may have a shape other than the regular circular shape. In this case, the bore diameter Dn corresponds to the distance between ends of the discharge port 62 at the position most distant in the scanning direction. When the discharge port 62 has a configuration in which a plurality of minute openings are arranged, the bore diameter Dn corresponds to the distance between outer ends in two minute openings arranged outermost in the scanning direction.

The opening/closing mechanism 70 opens and closes the flow path 65 to control the flowing out of the forming material from the nozzle 61. In the embodiment, the opening-closing mechanism 70 is configured by a butterfly valve. The opening/closing mechanism 70 is provided with a drive shaft 72, a valve body 73, and a valve drive unit 74.

The drive shaft 72 is a shaft-shaped member which extends in one direction. The drive shaft 72 is attached to the exit of the flow path 65 to intersect the flow direction of the forming material. In the embodiment, the drive shaft 72 is attached to be perpendicular to the flow path 65. In FIG. 2, the drive shaft 72 is disposed to be parallel with the Y direction. The drive shaft 72 is attached to be capable of rotating centered on a center axis of the drive shaft 72.

The valve body 73 is a plate-shaped member which rotates inside the flow path 65. In the embodiment, the valve body 73 is formed by machining a part which is disposed inside the flow path 65 of the drive shaft 72 into a plate shape. The shape of the valve body 73, when viewed in a direction which is perpendicular to the plate surface, substantially matches the opening shape of the flow path 65 at the part at which the valve body 73 is disposed.

The valve drive unit 74 generates a rotational driving force which rotates the drive shaft 72 under the control of the control unit 101. The valve drive unit 74 is configured by a stepping motor, for example. The valve body 73 rotates inside the flow path 65 according to the rotation of the drive shaft 72.

As illustrated in FIG. 2, a state in which the plate surface of the valve body 73 runs parallel to the flow direction of the forming material in the flow path 65 is a state in which the flow path 65 is open. In this state, the flowing of the forming material from the flow path 65 into the nozzle 61 is allowed, and the forming material flows out from the discharge port 62. A state in which the plate surface of the valve body 73 is perpendicular to the flow direction of the forming material in the flow path 65 is a state in which the flow path 65 is closed. In this state, the flowing of the forming material from the flow path 65 into the nozzle 61 is blocked, and the flowing out of the forming material from the discharge port 62 is stopped.

The forming table 210 is disposed at a position facing the discharge port 62 of the nozzle 61. The forming table 210 includes a top surface 211 which is disposed to be parallel to the X and Y directions. As described later, in the forming apparatus 100, the forming material on the top surface 211 of the forming table 210 is accumulated to form the formed object.

The moving mechanism 230 modifies the relative positional relation between the nozzle 61 and the forming table 210 under the control of the control unit 101. The moving mechanism 230 is configured by a three-axis positioner and modifies the relative position between the nozzle 61 and the forming table 210 in the three axial directions of the X, Y, and Z directions using the driving force of three motors M. In the embodiment, the moving mechanism 230 moves position of the forming table 210 with respect to the nozzle 61 in a state in which the position of the nozzle 61 is fixed.

In the forming apparatus 100, instead of a configuration in which the forming table 210 is moved by the moving mechanism 230, a configuration may be adopted in which the moving mechanism 230 moves the relative position of the nozzle 61 with respect to the forming table 210 in a state in which the position of the forming table 210 is fixed. Even in this configuration, it is possible to modify the relative positional relationship between the nozzle 61 and the forming table 210.

In the specification, unless otherwise specified, "the movement of the nozzle 61" means the modification in the relative position of the nozzle 61 with respect to the forming table 210. In addition, "the moving speed of the nozzle 61" means the relative speed of the nozzle 61 with respect to the forming table 210, and "the movement distance of the nozzle 61" means an amount of change in the relative position between the forming table 210 and the nozzle 61.

1-2-2. Details about Flat Screw

Figure 3:
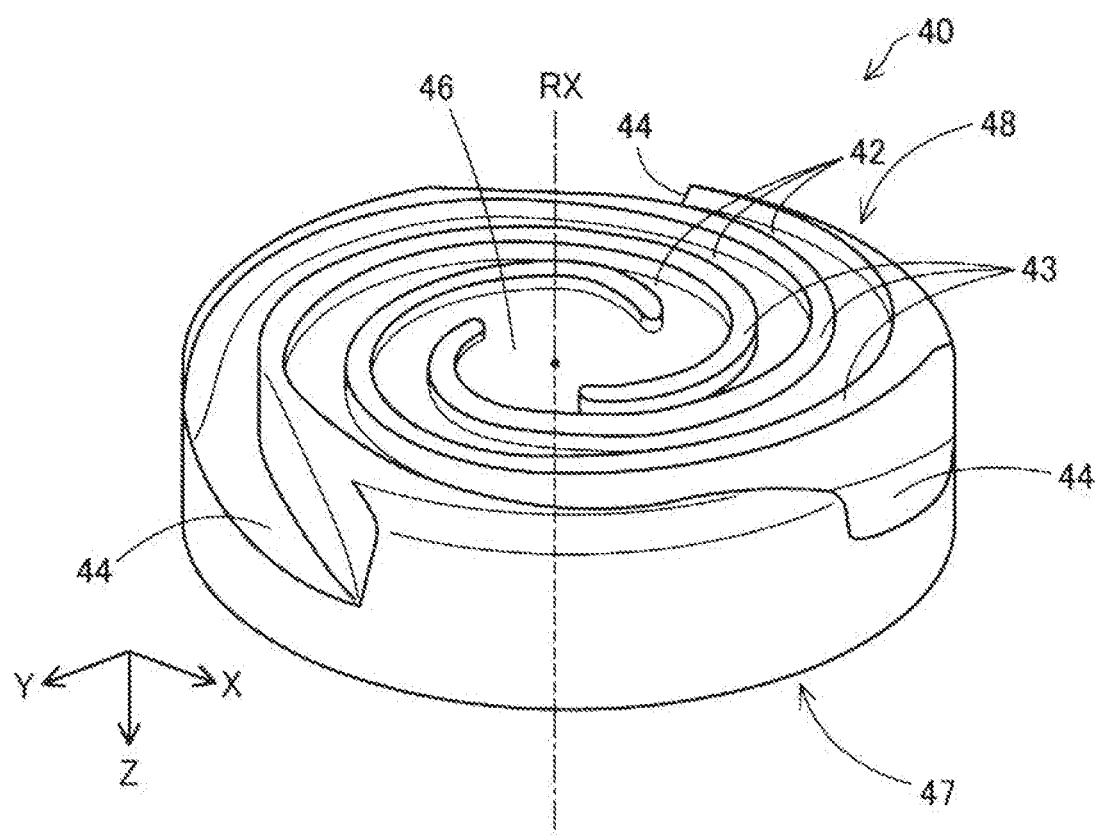
FIG. 3 is a schematic perspective view illustrating the configuration of a flat screw.

FIG. 3 is a schematic perspective view illustrating the configuration of the bottom surface 48 side of the flat screw 40. In FIG. 3, the position of the rotational axis RX of the flat screw 40 during the rotation in the forming material generating unit 30 is depicted using a dot-dash line. As explained with reference to FIG. 2, the groove portions 42 are provided in the bottom surface 48 of the flat screw 40 which faces the screw surface facing portion 50. Hereinafter, the bottom surface 48 will also be referred to as "the groove forming surface 48".

The center portion 46 of the groove forming surface 48 of the flat screw 40 is configured as a recessed portion to which one end of each of the groove portions 42 is connected. The center portion 46 faces the communicating hole 56 of the screw surface facing portion 50 which is depicted in FIG. 2. The center portion 46 intersects the rotational axis RX.

The groove portions 42 of the flat screw 40 configure so-called scroll grooves. Each of the groove portions 42 extends in a spiral shape to draw an arc from the center portion 46 toward the outer circumference of the flat screw 40. The groove portions 42 may be configured to extend in a helical shape. Ridge portions 43 which configure side wall portions of the groove portions 42 and extend along each of the groove portions 42 are provided on the groove forming surface 48.

The groove portions 42 continue to a material inflow port 44 which is formed in the side surface of the flat screw 40. The material inflow port 44 is a portion which accepts the material which is supplied via the communicating path 22 of the material supply unit 20.

When the flat screw 40 rotates, at least a portion of the material which is supplied from the material inflow port 44 is melted while being heated inside the groove portions 42 and the fluidity increases. The material flows to the center portion 46 through the groove portions 42, gathers at the center portion 46, and is guided to the nozzle 61 and is discharged from the discharge port 62 by the internal pressure which is generated by the gathering.

FIG. 3 illustrates an example of the flat screw 40 which includes three of the groove portions 42 and three of the ridge portions 43. The number of the groove portions 42 and the ridge portions 43 which are provided on the flat screw 40 is not limited to three. Only one of the groove portions 42 may be provided on the flat screw 40, and a plurality greater than or equal to two of the groove portions 42 may be provided on the flat screw 40. A predetermined number of the ridge portions 43 may be provided to match the number of the groove portions 42.

FIG. 3 illustrates an example of the flat screw 40 in which the material inflow port 44 is formed at three locations. The number of the material inflow ports 44 which are provided in the flat screw 40 is not limited to the three locations. The material inflow port 44 may be provided at only the one location in the flat screw 40, and may be provided at a plurality of greater than or equal to two locations.

Figure 4:
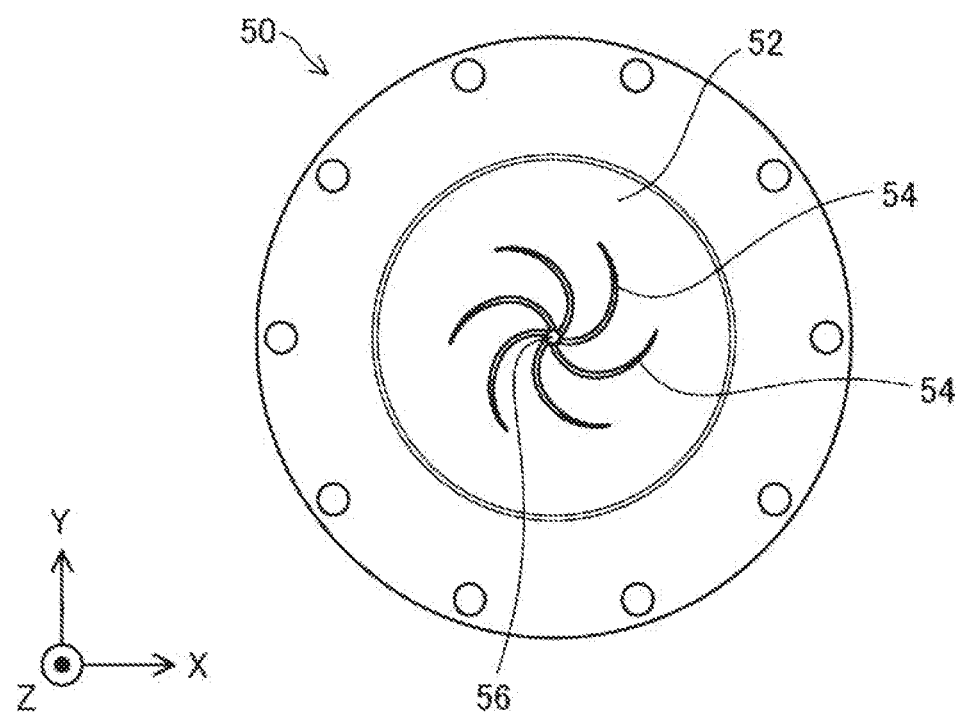
FIG. 4 is a schematic plan view illustrating the configuration of a screw surface facing portion.

FIG. 4 is a schematic perspective view illustrating the top surface 52 side of the screw surface facing portion 50. As described above, the top surface 52 of the screw surface facing portion 50 faces the groove forming surface 48 of the flat screw 40. Hereinafter, the top surface 52 will also be referred to as "the screw facing surface 52". The communicating hole 56 (described above) for supplying the forming material to the nozzle 61 is formed in the center of the screw facing surface 52.

A plurality of guide grooves 54 which are connected to the communicating hole 56 and extend in a spiral shape from the communicating hole 56 toward the outer circumference are formed in the screw facing surface 52. The plurality of guide grooves 54 have a function of guiding the forming material to the communicating hole 56. As explained with reference to FIG. 2, the heater 58 for heating the material is embedded in the screw surface facing portion 50. The melting of the material in the forming material generating unit 30 is realized through the heating by the heater 58 and the rotation of the flat screw 40.

Reference will be given to FIG. 2. By using the flat screw 40 which has a small size in the Z direction in the forming unit 110, the area occupied in the Z direction by the path for melting and guiding at least a portion of the material to the nozzle 61 is reduced. In this manner, by using the flat screw 40 in the forming apparatus 100, the generation mechanism of the forming material is reduced in size.

By using the flat screw 40 in the forming apparatus 100, the configuration which blows the forming material in the fluid state into the nozzle 61 is easily realized. With the configuration, the discharge amount of the forming material from the nozzle 61 can be controlled by controlling the rotation number of the flat screw 40, and the discharge control of the forming material from the nozzle 61 is made easy. "Discharge amount of the forming material from the nozzle 61" means the flow amount of the forming material flowing out from the discharge port 62 of the nozzle 61.

Since the forming apparatus 100 has a forming material generating mechanism using the flat screw 40, the forming material exhibiting fluidity is guided to the nozzle 61 through the flow path 65. Therefore, the discharge control of the forming material by the opening/closing mechanism 70 of a simple configuration which is provided downstream of the flow path 65 becomes possible, and the precision of the discharge control of the forming material MM is increased.

1-2-3. Forming with Three-Dimensional Forming Apparatus

Figure 5:
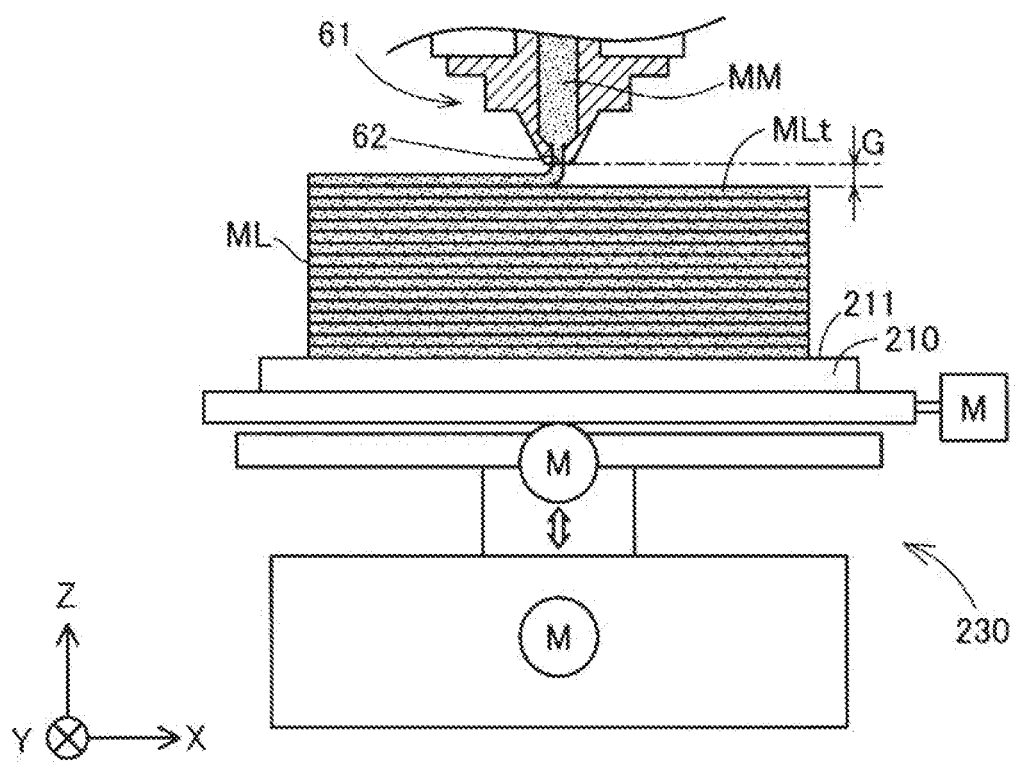
FIG. 5 is a schematic diagram illustrating a state during the forming by the three-dimensional forming apparatus.

FIG. 5 is a schematic diagram illustrating a state in which the forming apparatus 100 forms the formed object by a discharge process. When forming the formed object, the forming apparatus 100 executes the following discharge process under the control of the control unit 101.

As described above, in the discharge process, at least a portion of the material in a solid state supplied to the rotating flat screw 40 is melted in the forming material generating unit 30 and the forming material MM is generated accordingly. Then, the forming material MM is discharged from the nozzle 61 toward the top surface 211 of the forming table 210 while moving the nozzle 61 along the top surface 211 of the forming table 210 in the scanning direction by the moving mechanism 230. In the discharge process, the forming material MM discharged from the nozzle 61 is continuously accumulated in the scanning direction of the nozzle 61.

In a state in which the discharge of the forming material MM from the nozzle 61 is stopped, when the position of the nozzle 61 is modified with respect to the forming table 210, the control unit 101 closes the flow path 65 using the valve body 73 of the opening/closing mechanism 70 to move the nozzle 61. When the discharge process is resumed, the control unit 101 opens the flow path 65 using the valve body 73 of the opening/closing mechanism 70. As described above, with the forming apparatus 100, the accumulation position of the forming material MM by the nozzle 61 can be easily controlled by the opening/closing operation by the opening/closing mechanism 70. The opening/closing operation of the opening/closing mechanism 70 is controlled by an opening/closing command included in forming data.

Here, a layer formed of the forming material MM accumulated by the discharge process when the nozzle 61 is at the same height position with respect to the top surface 211 of the forming table 210 is referred to as a "forming layer ML". The control unit 101 moves the position of the nozzle 61 in the Z direction and, forms the formed object by further stacking the forming material MM, by another discharge process, on the forming material ML formed by the previous discharge process. That is, the formed object is formed by stacking the forming layer ML by the forming apparatus 100. The control unit 101 forms the formed object on the forming table 210 by controlling the movement of the nozzle 61 and the discharge of the forming material MM from the nozzle 61 according to the control contents of the nozzle 61 represented by the forming data MD, which will be described later.

Incidentally, it is desirable that, when forming the forming layer ML, a gap G be maintained between the discharge port 62 of the tip of the nozzle 61 and a planned part MLt where the forming material MM discharged from the nozzle 61 is to be accumulated in the vicinity of the position directly under the nozzle 61. When the forming material MM is accumulated on the forming layer ML, the planed part MLt where the forming material MM is to be accumulated is the top surface of the forming layer ML positioned below the nozzle 61.

It is desirable that the size of the gap G be equal to or greater than the bore diameter Dn (illustrated in FIG. 2) in the discharge port 62 of the nozzle 61, and it is more desirable that the size of the gap G be equal to or greater than 1.1 times the bore diameter Dn. Accordingly, the forming material MM which is discharged from the discharge port 62 of the nozzle 61 is accumulated in a free state in which the forming material is not pushed against the planned part MLt. As a result, it is possible to suppress the crushing of the horizontal sectional shape of the forming material MM which is discharged from the nozzle 61, and it is possible to reduce the surface roughness of the formed object. In a configuration in which a heater is provided in the periphery of the nozzle 61, it is possible to prevent the overheating of the forming material MM by the heater by forming the gap G, and discoloration and degradation caused by the overheating of the forming material MM after accumulating are suppressed. Meanwhile, it is desirable that the size of the gap G be equal to or less than 1.5 times the bore diameter Dn, and it is particularly desirable that the size of the gap G be equal to or less than 1.3 times the bore diameter Dn. Accordingly, a reduction in the positional deviation of the accumulation position of the forming material MM with respect to the planned part MLt and a reduction in the close adherence between the forming materials ML are suppressed.

1-2-4. Material Used in Three-Dimensional Forming Apparatus

A description will be given of the material which is used in the forming apparatus 100. In the forming apparatus 100, it is possible to form the formed object using various materials such as a material having plasticity, a metal material, or a ceramic material, for example, as a main material. Here, "the main material" means a material which is central to forming the shape of the formed object and means a material which occupies a content of greater than or equal to 50 wt % in the formed object. The forming material MM which is described above includes a forming material in which the main materials described above are melted in isolation, and a forming material in which a component which is a portion contained together with the main material is melted and rendered paste form.

In a case in which a thermoplastic material is used as the main material, the forming material MM is generated by the material being plasticized in the forming material generating unit 30. The term "plasticize" means that a heat is applied to the thermoplastic material and the material is melted.

It is possible to use a thermoplastic resin material, for example, as the thermoplastic material. Examples of Thermoplastic Resin Material General purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate. Engineering plastics such as polysulfone, polyethersulfone, polyphenylene sulfide, polyarylate, polyimide, polyamide imide, polyether imide, and polyether ether ketone.

In addition to pigments, metals, and ceramics, additives such as wax, flame retardant, antioxidant, thermal stabilizer may be mixed into the thermoplastic material. The thermoplastic material is plasticized by the rotation of the flat screw 40 and the heating of the heater 58 in the forming material generating unit 30 and is transformed to a melted state. The forming material MM which is generated in this manner is discharged from the nozzle 61, and then and is cured by a reduction in temperature.

It is desirable that the thermoplastic material be heated to a glass transition point or greater and be ejected from the nozzle 61 in a completely melted state. For example, the glass transition point of ABS resin is approximately 120° C. and it is desirable that the ABS plastic be approximately 200° C. at the time of ejection from the nozzle 61. A heater may be provided in the periphery of the nozzle 61 in order to eject the forming material MM in such a high-temperature state.

In the forming apparatus 100, the following metal materials may be used as the main material, for example, instead of the thermoplastic material which is described above. In this case, it is desirable that a component which melts during the generation of the forming material MM be mixed into a powder material obtained by rendering the following metal materials into a powder form and the result be inserted into the forming material generating unit 30.

Examples of Metal Material

A single metal or an alloy containing one or more metals from among magnesium (Mg), iron (Fe), cobalt (Co), chrome (Cr), aluminum (Al), titanium (Ti), copper (Cu), and nickel (Ni).

Examples of Alloy

Maraging steel, stainless steel, cobalt chromium molybdenum, titanium alloy, nickel alloy, aluminum alloy, cobalt alloy, and cobalt chromium alloy.

It is possible to use a ceramic material as the main material instead of the metal material in the forming apparatus 100. For example, it is possible to use oxide ceramics such as silicon dioxide, titanium dioxide, aluminum oxide, and zirconium oxide, and non-oxide ceramics such as aluminum nitride as the ceramic material. In a case in which a metal material or a ceramic material such as those described above is used as the main material, the forming material MM which is disposed on the forming table 210 may be cured by sintering.

The powder material of the metal material or the ceramic material which is inserted into the material supply unit 20 may be a mixed material in which a plurality of types of powders of a single metal, powders of alloys, and powders of ceramic material are mixed together. The powder material of the metal material or the ceramic material may be coated with a thermoplastic resin such as those exemplified above, or alternatively, a different thermoplastic resin, for example. In this case, in the forming material generating unit 30, the fluidity may be realized by melting the thermoplastic resin.

It is possible to add the following solvents, for example, to the powder material of the metal material or the ceramic material which is inserted into the material supply unit 20. It is possible to use one species or two or more species in combination as the solvent.

Examples of Solvent

Water; (poly) alkylene glycol monoalkyl ethers such as ethylene glycol monomethyl ether, ethylene glycol monoethyl ether, propylene glycol monomethyl ether, and propylene glycol monoethyl ether; acetic acid esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetraalkyl ammonium acetates; sulfoxide solvents such as dimethyl sulfoxide, and diethyl sulfoxide; pyridine-based solvents such as pyridine, γ-picoline, and 2,6-lutidine; tetraalkyl ammonium acetate (for example, tetrabutyl ammonium acetate or the like); and ionic liquids such as butyl carbitol acetate.

Besides, it is possible to add the following binders, for example, to the powder material of the metal material or the ceramic material which is inserted into the material supply unit 20.

Examples of Binder

Acrylic resin, epoxy resin, silicone resin, cellulose resin, or alternatively, another synthetic resin or polylactic acid (PLA), polyamide (PA), polyphenylene sulfide (PPS), polyether ether ketone (PEEK), or alternatively, another thermoplastic resin.

1-3. Path Data Generating Unit and Path Data

Figure 6:
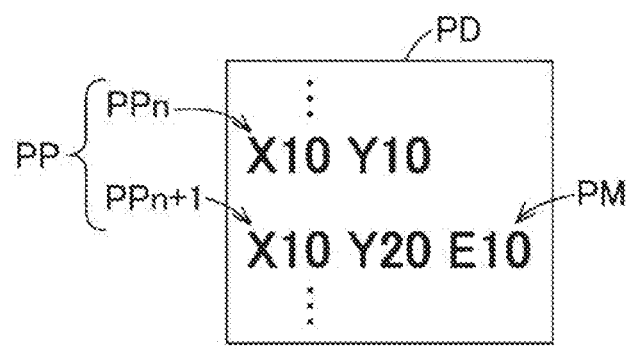
FIG. 6 is a schematic diagram illustrating an example of path data.

FIG. 6 is a schematic diagram illustrating an example of path data PD which the path data generating unit 12 of the control device 11 in the forming system 10 generates. Information described in the path data PD is interpreted by being sequentially read from the top to the bottom of FIG. 6. The path data PD includes parameters specifying control contents of the nozzle 61 such that the forming apparatus 100 forms the formed object represented by the original data OD. Here, "the control contents of the nozzle 61" includes control of the movement of the nozzle 61 with respect to the forming table 210 and control of discharge of the forming material MM from the nozzle 61. In the path data PD of the embodiment, the control of the movement of the nozzle 61 is indicated by a path parameter PP. In addition, the control of the discharge of the forming material MM from the nozzle 61 is indicated by a discharge parameter PM.

The path parameter PP specifies the coordinates (X, Y) of a coordinate system with the X direction and the Y direction as the coordinate axes, on the top surface 211 of the forming table 210 where the nozzle 61 have to be positioned next. In the path data PD, a path is specified consecutively lined up. The suffix "n" is a natural number. "Path" is a unit of the movement path of the nozzle 61, and means a path of a section when the movement of the nozzle 61 at the time of forming the forming layer ML is sectioned by linear movement in one direction from any given coordinate to the next coordinate.

In the example of FIG. 6, the path along which the nozzle 61 moves in the Y direction by a predetermined unit distance of +10 from coordinates (10, 10) to coordinates (10, 20) is specified by the set of two path parameters $PP_n$, $PP_{n+1}$. In this way, it is interpreted that the path data PD includes the path indicating the movement direction and the movement distance of the nozzle 61.

The discharge parameter PM is added after the path parameter PP. The discharge parameter PM specifies the amount of the forming material MM discharged while the nozzle 61 is moving to the coordinates indicated by the path parameter PP. That is, the discharge parameter PM represents the total amount of the forming material MM disposed on the forming table 210 along with the movement of the nozzle 61 which is represented by the path included in the path data PD.

In the example of FIG. 6, after the character "E" indicating the discharge parameter PM, an integer value indicating the amount of the forming material MM expressed in a predetermined unit amount is added. In the example, it is specified that 10 unit amounts of forming material MM is discharged while moving the nozzle 61 from the coordinates (10, 10) to the coordinates (10, 20).

The path data PD is data that can be used when causing a forming apparatus to form an formed object, even in a case where the forming apparatus is a type of forming apparatus that is not configured to control discharge of the forming material MM by a valve such as the opening/closing mechanism 70 as in the forming apparatus 100 of the embodiment. In the embodiment, the path data PD has the same data type as the data input into a 3D printer of what is called a thermal melting stacking method (FDM method). The path data generating unit 12 may generate the path data PD using known software, called slicer, developed for the FDM 3D print. In the forming system 10 of the embodiment, based on the path data PD, forming data MD suitable for the forming apparatus 100 to which the opening/closing mechanism 70 is added is generated by a data generating process which will be described below.

1-4. Data Generating Process

Figure 7:
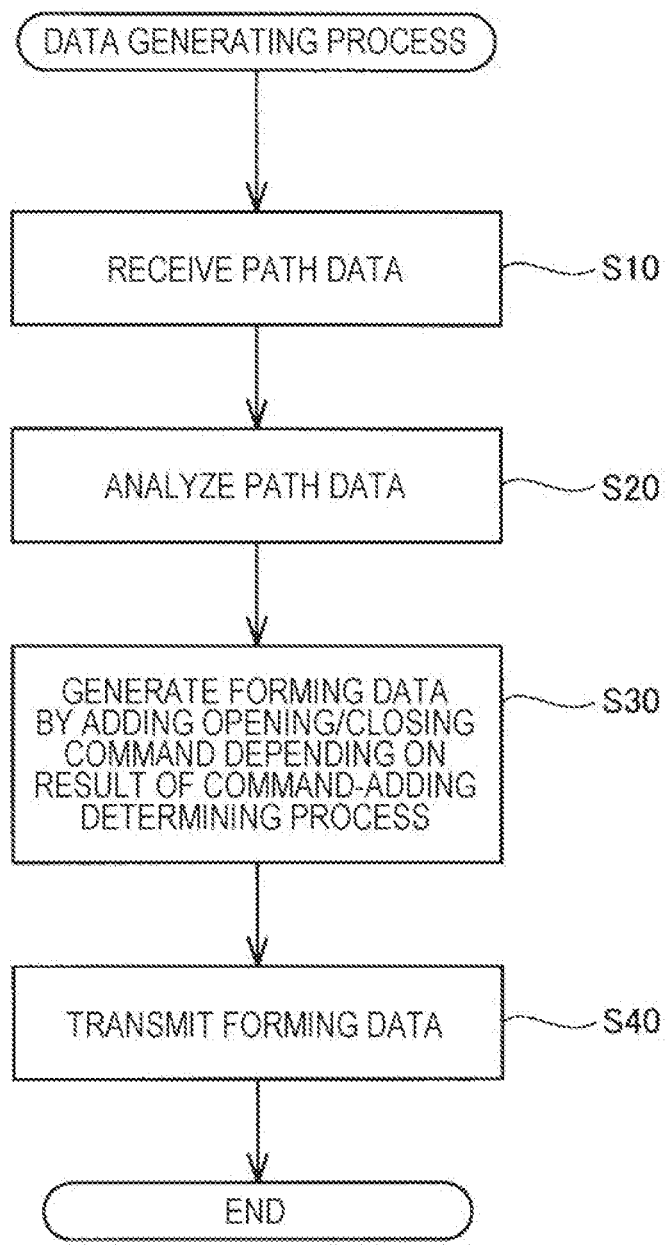
FIG. 7 is an explanatory diagram illustrating the flow of a data generating process.

FIG. 7 is an explanatory diagram illustrating the flow of a data generating process executed in the forming data generating unit 13. The data generating process is a process of generating the forming data MD by adding an opening/closing command for driving the opening/closing mechanism 70 to the path data PD according to the path indicated by the path parameter PP in the path data PD and the discharge parameter PM. In the data generating process, the forming data generating unit 13 analyzes the control contents of the nozzle 61 described in the path data PD, and adds the opening/closing command to the path data PD such that the forming material MM is appropriately discharged from the nozzle 61 by driving the opening/closing mechanism 70.

In step S10, the receiving unit 14 of the forming data generating unit 13 receives input of path data PD generated by the path data generating unit 12. The Receiving unit 14 outputs the path data PD to the command adding unit 15.

In step S20, the command adding unit 15 analyzes the contents of the path data PD. The command adding unit 15 analyzes the path data PD and specifies the control contents of the following nozzle 61 described in the path data PD.

Reference will be given to FIG. 6. The command adding unit 15 specifies the path along with the nozzle 61 moves while discharging the forming material MM, from the path parameter PP and the discharge parameter PM of the path data PD. Hereinafter, the path along which the nozzle 61 moves while discharging the forming material MM is also simply referred to as "material discharge path."

The command adding unit 15 acquires the movement distance and the moving speed of the nozzle 61 in each material discharge path. The movement distance of the nozzle 61 in each material discharge path is calculated from coordinate values of the path parameters $PP_n$, $PP_{n+1}$ indicating a start position and an end position of the material discharge path. The moving speed of the nozzle 61 is the average speed of the nozzle 61 in each path, and is a speed that is assigned to each path in the forming apparatus 100 in advance according to the level of the forming speed designated in advance by a user of the forming system 10. The command adding unit 15 further acquires an angle at which the movement direction of the nozzle 61 is changed between two consecutive material discharge paths.

Figure 8:
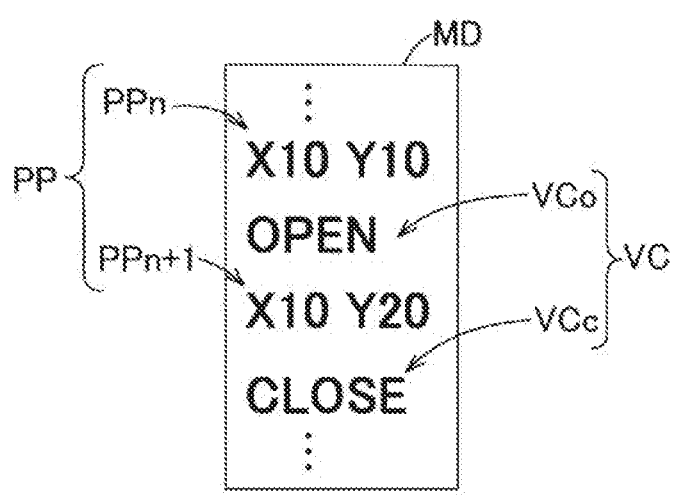
FIG. 8 is a schematic diagram illustrating an example of forming data.

Reference will be given to FIG. 8. FIG. 8 is a schematic diagram illustrating an example of the forming data MD generated in the process of step S30. The forming data MD of FIG. 8 is generated based on the path data PD illustrated in FIG. 6 and corresponds to one in which the opening/closing command VC is added to a portion of the of the path data PD.

In step S30, the command adding unit 15 executes a command-adding determining process, which will be described later, using the analysis result in step S20. Then, according to the determination result, the opening/closing command VC that drives the opening/closing mechanism 70 is added to the path data PD to generate the forming data MD. The opening/closing command data VC includes an opening command VCo and a closing command VCc. The opening command VCo represents a command that causes the opening/closing mechanism 70 to open the flow path 65 so as to allow the forming material MM to be discharged from the nozzle 61. The closing command VCc represents a command that causes the opening/closing mechanism 70 to close the flow path 65 so as to stop discharge of the forming material MM from the nozzle 61.

In the command-adding determining process, the command adding unit 15 adds the opening/closing command VC such that the opening/closing mechanism 70 opens at the start position of the material discharge path and is closed at the end position of the material discharge path, unless determination is made that addition of the opening/closing command VC is to be prohibited. Specifically, the command adding unit 15 adds the opening command VCo at the start position of the material discharge path and adds the closing command VCc at the end position of the path. In the example of FIG. 8, after the path parameter $PP_n$ indicating the coordinate of the start position of the material discharge path, the opening command VCo is added, and after the path parameter $PP_{n+1}$ indicating the coordinate of the end position, the closing command VCc is added.

T FIG. 9 is an explanatory diagram illustrating an example of the flow of the command-adding determining process executed by the command adding unit 15. In the embodiment, the command adding unit 15 determines whether or not to add the opening/closing command VC between two consecutive material discharge paths by the command-adding determining process. "Between two consecutive material discharge paths" means a period from the end of the scanning of the nozzle 61 in the preceding material discharge path to the start of the scanning of the nozzle 61 in the next material discharge path. The threshold in each step of the determining process below is a predetermined value depending on various conditions such as drive characteristics of the opening/closing mechanism 70 such as the opening/closing speed and the response speed of the opening/closing mechanism 70, the discharge performance of the nozzle 61, drive characteristics of the moving mechanism 230, and characteristics of the forming material MM.

In step S100, the command adding unit 15 determines whether or not the moving speed of the nozzle 61 in each material discharge path is equal to or greater than the predetermined threshold. When the moving speed of the nozzle 61 is greater, the opening/closing speed and the response speed of the opening/closing mechanism 70 cannot catch up with the moving speed of the nozzle 61. In this case, there is possibility that the timing of starting discharge of the forming material MM and timing of ending discharge of the forming material MM may be delayed. Therefore, in the embodiment, the moving speed of the nozzle 61 is set to be one of the conditions for determining whether or not to add the opening/closing command VC. In step S100, when it is determined that the moving speed of the nozzle 61 is equal to or greater than the threshold, the process proceeds to step S110 for determining by the command adding unit 15.

In step S110, the command adding unit 15 executes determination on the movement distance of the nozzle 61. In step S110, the command adding unit 15 determines whether or not the movement distance of the nozzle 61 in the material discharge path at the back between two consecutive material discharge paths is equal to or greater than the predetermined threshold. When the movement distance of the nozzle 61 is smaller than the threshold, that is, the subsequent material discharge path positioned consecutively after the preceding material discharge path is short, the command adding unit 15 determines that addition of the opening/closing command VC between two consecutive material discharge paths is to be prohibited. As a result, the opening/closing mechanism 70 is temporarily closed at the end of the preceding material discharge path and the start of discharge of the forming material MM in the subsequent forming discharging path is delayed, which makes it possible to suppress shortage of the accumulation amount of forming material MM in the short forming part formed in the subsequent material forming discharging path which is short in length. In addition, the decrease in the forming speed caused by driving of the opening/closing mechanism 70 before the short material discharge path can be suppressed. When it is determined that the moving speed of the nozzle 61 is equal to or greater than the threshold in step S110, the process proceeds to step S120 for determining by the command adding unit 15.

In step S120, the command adding unit 15 executes determination on the angle between two material discharge paths. Here, "angle" means an angle of 180 degrees or less out of two angles between two paths. When the angle between the two material discharge paths is a gentle angle equal to or greater than the predetermined threshold, the command adding unit 15 determines that addition of the opening/closing command VC between the two material discharge paths is to be prohibited. As a result, the opening/closing mechanism 70 performs opening/closing at a corner portion between the two material discharging paths, which makes it possible to suppress fluctuation in the amount of forming material MM to be discharged from a predetermined amount. Therefore, it is possible to suppress deterioration of forming precision at the corner portion of the gentle angle at which the form change becomes remarkable when there is an error in the amount of the forming material MM. Furthermore, since the nozzle 61 continuously scans between the two material discharge paths, it is possible to shorten the forming time. In step S120, when the angle between the two material discharge paths is a sharp angle smaller than the predetermined threshold, the command adding unit 15 determines that the opening/closing command VC is to be added between the two material discharge paths. As a result, continuous scanning by the nozzle 61 is performed at the corner portion between the two material discharge paths, and the corner portion which is to have a sharp angle is prevented from being round, which makes it possible to suppress deterioration of forming precision of the corner angle.

In the first step S100, when it is determined that the moving speed of the nozzle 61 is greater than the threshold, the process proceeds to step S130 for determining by the command adding unit 15. In step S130, as in step S120, determination is made on the angle between the two material discharge paths. In the embodiment, the threshold used for determining in step S130 is smaller than the threshold in step S120 because the moving speed of the nozzle 61 is slow. In another embodiment, the threshold used for determining in step S130 may be the same value as the threshold in step S120, or may be a larger value than the threshold in step S120. When the angle between the two material discharge paths is the gentle angle equal to or greater than the threshold, the command adding unit 15 determines that addition of the opening/closing command VC between the two material discharge paths is to be prohibited. As a result, fluctuation in the amount of forming material MM at the corner portion formed by the two material discharge paths, which is caused by opening/closing operations of the opening/closing mechanism 70, can be suppressed, which makes it possible to suppress deterioration of forming precision at the corner portion. Furthermore, it is possible to shorten the forming time. On the other hand, in step S130, when the angle between the two material discharge paths is smaller than the predetermined threshold, the command adding unit 15 determines that the opening/closing command VC is to be added between the two material discharge paths. As a result, the corner portion between the two material discharge paths is prevented from being rounded, and deterioration of forming precision at the corner portion is suppressed.

As described above, by the determining of the command-adding determining process, the opening/closing command VC is added to the appropriate position of the path data PD according to the control contents of the nozzle 61 described in the path data PD such that the driving of the opening/closing mechanism 70 is properly performed when a formed object is formed. Furthermore, when the opening/closing command VC is added, it is desirable that the command adding unit 15 delete the discharge parameter PM from the path data PD. In this way, the forming data MD can be made more compact, which is efficient.

Reference will be given to FIG. 7. In step S40 of the data generating process, the forming data MD generated by the command adding unit 15 is transmitted to the control unit 101 of the forming apparatus 100. The forming apparatus 100 scans the nozzle 61 while driving the opening/closing mechanism 70 according to the forming data MD to form a formed object.

1-5. Summary

With the forming system 10 of the embodiment, the forming data MD suitable for the forming apparatus 100 capable of efficiently driving the opening/closing mechanism 70 is automatically and simply generated from the path data PD in which the movement of the nozzle 61 and the discharge of the forming material MM from the nozzle 61. Therefore, for example, even when the forming apparatus 100 is modified from the configuration without the opening/closing mechanism 70 to the configuration with the opening/closing mechanism 70, the forming system 10 easily and efficiently copes with the configuration change of the forming apparatus. Particularly, since the path data PD is created using 3D printer software of the known FDM method in the forming system 10 of the embodiment, the forming system 10 is made more efficient.

With the forming system 10 of the embodiment, the control device 11 includes the path data generating unit 12. Therefore, when the original data OD such as the CAD data is input to the control device 11, the forming data MD can be generated in the control device 11, and the control device 11 can cause the forming device 100 to form a formed object as it is originally intended to be formed. As a result, the process of forming the formed object after generating the CAD data becomes simplified, which is efficient.

With the forming system 10 of the embodiment, the forming data generating unit 13 determines whether or not to add the opening/closing command VC between the two consecutive material discharge paths according to the determination result on the moving speed of the nozzle 61 in the material discharge path. As a result, excessive discharge of the forming material MM due to the delayed closing operation of the opening/closing mechanism 70 at the end position of the preceding material discharge path, and insufficiency in the forming material MM in the subsequent material discharge path caused by the delayed opening operation of the opening/closing mechanism 70 in the start position of the subsequent material discharge path are suppressed.

With the forming system 10 of the embodiment, the forming data generating unit 13 determines whether or not to add the opening/closing command VC between the two consecutive material discharge paths according to the determination result on the movement distance of the nozzle 61 in the material discharge path. Accordingly, the discharge timing of the forming material MM from the nozzle 61 is delayed due to the length of the material discharge path, which suppresses deterioration of forming precision. In addition, the lowering of the forming speed is suppressed by driving the opening/closing mechanism 70 before the short material discharge path.

With the forming system 10 of the embodiment, the forming data generating unit 13 determines whether or not to add the opening/closing command VC between the two material discharge paths according to the determination result on the angle between the two consecutive material discharge paths. As a result, it is possible to suppress deterioration of forming precision at the corner portion between the two material discharge paths.

As described above, with the forming system 10, the method of generating the forming data MD, the program that implements a function of executing a computer constituting the control device 11 to generate the forming data MD of the embodiment, it is possible to obtain various operational advantages described in the embodiment.

2. Other Embodiments

Various configurations described in the embodiment can be modified in the manners described hereinafter, for example. All of the other embodiments described hereinafter is posited as examples for embodying the invention in the same manner as the embodiment which is described above.

2-1. First Other Embodiment

In the embodiment, the forming data generating unit 13 is configured to serve as one functional unit which is implemented by executing a program in the control device 11. On the other hand, the forming data generating unit 13 may be connected to the forming apparatus 100, and may be configured as a single forming data generating apparatus that performs the same process as the data generating process described in the first embodiment.

2-2. Second Other Embodiment

In the forming system 10, the path data generating unit 12 may be constituted by a computer separated by the control device 11, or may be configured as a single unit separated from the control device 11. Furthermore, the forming system 10 may not include the path data generating unit 12 of the control device 11, and instead, may have a configuration in which the forming data MD is generated in the forming data generating unit 13 of the control device 11 based on path data PD generated outside the system.

2-3. Third Other Embodiment

The flow of the command-adding determining process executed by the command-adding unit 15 of the forming data generating unit 13 is not limited to those described in the above embodiments. For example, the determining details and conditions of the command-adding determining process may be modified such that the discharge of the forming material MM is appropriately performed depending to the type or property of the forming material, the configuration of the nozzle 61, the content of the movement control of the nozzle 61, or the like.

For example, the command adding unit 15 may only execute determination on the moving speed of the nozzle 61 in the material discharge path, and add the opening/closing command VC according to the determining result. More specifically, when the moving speed of the nozzle 61 in the material discharge path is equal to or greater than the threshold, addition of opening/closing command VC may be prohibited such that the drive timing of the opening/closing mechanism 70 is not delayed. On the contrary, when the moving speed of the nozzle 61 in each of the two consecutive material discharge paths is less than the threshold, addition of the opening/closing command VC between the two consecutive material discharge paths may be prohibited so as to give priority to the forming speed over the forming precision.

The command adding unit 15 may execute only determination on the movement distance of the nozzle 61 in the material discharge path, and add the opening/closing command VC according to the determining result. The command adding unit 15 may not execute determination on the moving speed of the nozzle 61, and as in the above embodiments, may prohibit addition of the opening/closing command VC when the movement distance of the nozzle 61 in the subsequent material discharge path of the two consecutive material discharge paths is equal to or greater than the threshold. In addition, for example, when the movement distance of the nozzle 61 in each of the two consecutive material discharge paths is equal to or greater than the threshold, the command adding unit 15 may prohibit addition of the opening/closing command VC between the two consecutive material discharge path, for example, for reasons such as giving priority to the forming speed over the forming precision.

The command adding unit 15 may execute only determination on the angle at which the nozzle 61 changes direction between two consecutive material discharge paths and add the opening/closing command VC according to the determining result. The command adding unit 15 may not execute determination on the moving speed and the movement distance of the nozzle 61, and as in the above embodiments, may prohibit addition of the opening/closing command when the angle between the two consecutive material discharge paths is equal to or greater than the threshold. Alternatively, for example, even if the angle between the two consecutive material discharge paths is less than the threshold, the command adding unit 15 may prohibit addition of opening/closing command VC of the two consecutive discharge paths, for example, when the forming speed has priority over the forming precision at the corner portion.

Here, the forming precision in the two consecutive material discharge paths may be affected by the length of the preceding material discharge path. Therefore, the command adding unit 15 may modify the contents of the determination on addition of the opening/closing command VC, for example, depending on the movement distance of the nozzle 61 in the preceding material discharge path of the two consecutive material discharge paths. For example, the command adding unit 15 may modify the contents of determination on the angle between the two consecutive material discharge paths depending on the nozzle 61 in the preceding material discharge path, as follows.

When the movement distance of the nozzle 61 in the preceding material discharge path is less than the threshold, the command adding unit 15 prohibits addition of the opening/closing command VC between the two material discharge paths regardless of the movement distance of the nozzle 61 in the subsequent material discharge path and the angle between the two material discharge paths. This is because, when the opening/closing mechanism 70 is operated at the end position of the preceding material discharge path in a case where the movement distance of the nozzle 61 in the preceding material discharge path is short, there is a possibility that the error of the amount of the forming material MM discharged before and after the operation becomes large and there is a possibility that the forming time is increased. Further, only when the movement distance of the nozzle 61 in the subsequent material discharge path is equal to or greater than the threshold when the movement distance of the nozzle 61 in the preceding material discharge path is less than the threshold, the command adding unit 15 may determine addition of the opening/closing command VC between the two material discharge paths when the angle between the two material discharge paths is less than the threshold. This is because, if the operating/closing operation of the opening/closing mechanism 70 is omitted when the movement distance of the nozzle 61 in the subsequent material discharge path is long, there is a possibility that the forming error of the shape of the corner portion of the two material discharge paths becomes remarkable.

When the movement distance of the nozzle 61 in the preceding material discharge paths is equal to or greater than the threshold and the movement distance of the nozzle 61 in the subsequent material discharge path is less than the threshold, the command adding unit 15 prohibits addition of the opening/closing command VC when the angle between the two material discharge paths is equal to or greater than the first threshold. Then, when the angle is less than the first threshold, addition of the opening/closing command VC is determined. On the other hand, when the movement distances of the nozzle 61 in the two material discharge paths are both equal to or greater than the threshold, the command adding unit 15 prohibits addition of the opening/closing command VC when the angle between the two material discharge paths is equal to or greater than the second threshold that is different from the first threshold, and determines the opening/closing command VC when the angle is less than the second threshold. The reason for changing the threshold in executing determination on the angle is that the angle at which the deterioration of forming precision of the corner portion becomes remarkable may be changed by not operating the opening/closing mechanism 70 at the corner portion depending on the movement distance of the nozzle 61 in the subsequent material discharge path.

The command adding unit 15 may add the opening/closing command VC by combining any two or more of the determination on the moving speed of the nozzle 61, the determination on the movement distance of the nozzle 61, and the determination on the angle at which the nozzle 61 changes direction. Further, the command adding unit 15 may determine whether or not to add the opening/closing command VC based on the determination criteria other than the three determinations described above. The command adding unit 15 may execute determination, for example, based on the discharge parameter PM. For example, for an intermediate material discharge path disposed between the two material discharge paths, when the amount of the discharged forming material MM is less than the threshold and the length of the intermediate material discharge path is shorter than the threshold, the command adding unit 15 may determine that the opening/closing mechanism 70 is kept closed in the immediate material discharge path.

2-4. Fourth Other Embodiment

The path data PD may not be data of the same type as the data used in the FDM 3D printer, and may not be data that can be created by a slicer which is a well-known software. The path data PD may include a parameter and command other than the path data PD and the discharge parameter PM.

2-5. Fifth Other Embodiment

The forming apparatus 100 is not limited to the configuration in which the forming material MM is generated by the flat screw 40 and is discharged from the nozzle 61. For example, the forming apparatus 100 may have the configuration in which the forming material MM prepared beforehand is discharged from the nozzle 61 by the pressure generated by a plunger or a piezoelectric element.

2-6. Sixth Other Embodiment

The opening-closing mechanism 70 of the forming apparatus 100 may be configured by a shutter which moves to intersect the direction in which the forming material flows inside the flow path 65. The opening-closing mechanism 70 may be configured by the plunger in which a piston protrudes into the flow path 65 to block the flow path 65. The opening/closing mechanism 70 may be configured by combining two or more of the butterfly valve which is described in the embodiment, a shutter mechanism which uses a shutter, and the plunger.

2-7. Seventh Other Embodiment

In the embodiment, the material supply unit 20 may include a configuration which includes a plurality of hoppers. In this case, a different material may be supplied from each hopper to the flat screw 40 and be mixed inside the groove portions 42 of the flat screw 40 to generate the forming material. For example, a powder material which serves as the main material which is described in the embodiment and solvents, binders, and the like which are added to the powder material may be supplied to the flat screw 40 from separate hoppers in parallel.

2-8. Eighth Other Embodiment

In the embodiment, a portion or all of the functions and processes which are realized using software may be realized using hardware. A portion or all of the functions and processes which are realized using hardware may be realized using software. It is possible to use various circuits such as integrated circuits, discrete circuits, or circuit modules which combine such circuits, for example, as the hardware.

3. Other Aspects

The invention is not limited to the embodiments and application examples which are described above and it is possible to realize the invention with various aspects in a scope that does not depart from the gist of the invention. For example, it is possible to realize the invention as the following aspects. Hereinafter, in order to solve a portion or all of the problems of the invention, or alternatively, in order to achieve a portion or all of the effects of the invention, it is possible to replace or combine, as appropriate, the technical features in the embodiments corresponding to technical features in the aspects which are described hereinafter. As long as a technical feature is not described as required in the specification, it is possible to remove the technical feature, as appropriate.

1. The first aspect is provided as a three-dimensional forming system including a three-dimensional forming apparatus and a control device. The three-dimensional forming apparatus of the three-dimensional forming system in the aspect includes a nozzle that discharges a forming material toward a forming table, an opening/closing mechanism that opens or closes a flow path of the forming material connected to the nozzle, a moving mechanism that changes a relative position between the forming table and the nozzle, and a control unit that controls the opening/closing mechanism and the moving mechanism according to forming data. The control device includes a forming data generating unit that analyzes path data including a path indicating a relative movement direction and a movement distance of the nozzle with respect to the forming table and a discharge parameter indicating discharging of the forming material, generates the forming data by adding an opening/closing command for driving the opening/closing mechanism to the path data, and transmits the forming data to the three-dimensional forming apparatus.

According to the forming system of the aspect, under the drive control of the opening/closing mechanism, the forming data in which the opening/closing command for driving the opening/closing mechanism is added to the path data that is not assumed can be easily generated. With such a forming system, the path data capable of being used in the forming apparatus that does not have the opening/closing mechanism can be converted into the forming data suitable for the forming apparatus that has the opening/closing mechanism, which makes the invention efficient.

2. In the three-dimensional forming system of the aspect, the control device may further include a path data generating unit that generates the path data from original data representing a shape of a three-dimensional formed object, and outputs the path data to the forming data generating unit.

According to the forming system of the aspect, the forming data can be generated from the original data such as three-dimensional CAD data to cause the forming apparatus to form a formed object, which makes the invention efficient.

3. In the three-dimensional forming system of the aspect, the forming data generating unit may analyze the path data, acquire a moving speed of the nozzle when the nozzle is moved while discharging the forming material, and determine whether or not to add the opening/closing command using the moving speed.

According to the forming system of the aspect, it is possible to obtain the forming data to which the opening/closing command is added such that the driving of the opening/closing mechanism is appropriately executed depending on the moving speed of the nozzle in the path.

4. In the three-dimensional forming system of the aspect, the forming data generating unit may analyze the path data, acquire a movement distance of the nozzle in a movement path represented by the path, and determine whether or not to add the opening/closing command using the movement distance.

According to the forming system of the aspect, it is possible to obtain the forming data to which the opening/ closing command is added such that the driving of the opening/closing mechanism is appropriately executed depending on the movement distance of the nozzle in the path.

5. In the three-dimensional forming system of the aspect, the forming data generating unit may analyze the path data, acquire an angle at which the movement direction of the nozzle changes between two consecutive paths, and determine whether or not to add the opening/closing command between the two consecutive paths using the angle.

According to the forming system of the aspect, it is possible to obtain the forming data to which the opening/closing command is added such that the driving of the opening/closing mechanism between the two paths is appropriately executed depending on the angle between the two paths.

6. In the three-dimensional forming system of the aspect, the three-dimensional forming apparatus may further include a forming material generating unit that has a flat screw, generates the forming material by melting at least a portion of material supplied to the flat screw that is rotating, and guides the generated forming material to the nozzle.

According to the forming system of the aspect, it is possible to miniaturize a mechanism for generating the forming material using the flat screw. Furthermore, the precision of discharge control of the forming material from the nozzle by the opening/closing mechanism is increased.

7. The second aspect is provided as a data generating apparatus that is connectable to a three-dimensional forming apparatus including a nozzle that discharges forming material toward a forming table, an opening/closing mechanism that opens or closes a flow path of the forming material connected to the nozzle, a moving mechanism that changes a relative position between the forming table and the nozzle, and a control unit that controls the opening/closing mechanism and the moving mechanism according to forming data. The data generating apparatus of the aspect includes a receiving unit that receives input of path data including a path indicating a relative movement direction and a movement distance of the nozzle with respect to the forming table and a discharge parameter indicating discharging of the forming material, and a forming data generating unit that analyzes the path data and adds an opening/closing command for driving the opening/closing mechanism to the path data to generate the forming data.

According to the data generating apparatus of the aspect, it is possible to easily generate the forming data in which the opening/closing command for driving the opening/closing mechanism is added to the path data. Using the data generating apparatus, the path data usable in the forming apparatus that does not have the opening/closing mechanism can be converted into the forming data suitable for the forming apparatus that has the opening/closing mechanism, which is efficient.

8. The third aspect is provided as a method of generating forming data to be input to a three-dimensional forming apparatus including a nozzle that discharges forming material toward a forming table, an opening/closing mechanism that opens or closes a flow path of the forming material connected to the nozzle, a moving mechanism that changes a relative position between the forming table and the nozzle, and a control unit that controls the opening/closing mechanism and the moving mechanism according to the forming data. The method of the aspect includes receiving input of path data including a path indicating a relative movement direction and a movement distance of the nozzle with respect to the forming table and a discharge parameter indicating discharging of the forming material, and analyzing the path data and adding an opening/closing command for driving the opening/closing mechanism to the path data.

According to the method of the aspect, it is possible to easily generate the forming data in which the opening/closing command for driving the opening/closing mechanism to the path data. According to the method, the path data generated for the forming apparatus that does not have the opening/closing mechanism can be converted into the forming data for the forming apparatus that has the opening/closing mechanism, which is efficient.

9. The fourth aspect is provided as a program that causes a computer to execute a process including a function of generating forming data to be input to a three-dimensional forming apparatus including a nozzle that discharges forming material toward a forming table, an opening/closing mechanism that opens or closes a flow path of the forming material connected to the nozzle, a moving mechanism that changes a relative position between the forming table and the nozzle, and a control unit that controls the opening/closing mechanism and the moving mechanism according to the forming data. The process of the aspect includes a function of receiving input of path data including a path indicating a relative movement direction and a movement distance of the nozzle with respect to the forming table and a discharge parameter indicating discharging of the forming material, and a function of analyzing the path data and adding an opening/closing command for driving the opening/closing mechanism to the path data.

According to the program of the aspect, with the computer, it is possible to easily generate the forming data in which the opening/closing command for driving the opening/closing mechanism is added to the path data. By using the program, with the computer, the path data generated for the forming apparatus that does not have the opening/closing mechanism can be converted into the forming data for the forming apparatus that has the opening/closing mechanism, which is efficient.

The invention can be implemented in various forms other than the forming system, the data generating apparatus, the method of generating forming data, and a computer program of generating forming data. For example, it can be implemented in the form of the forming data generated in the forming system, the forming data generated by the data generating apparatus, the method of generating forming data and the computer program of generating forming data, and a non-transitory storage medium in which the computer program or the forming data are recorded, and the like.

What is claimed is:

1. A three-dimensional forming system comprising:
   a three-dimensional forming apparatus,
   the three-dimensional forming apparatus including:
      a nozzle that discharges a forming material toward a forming table;
      an opening/closing mechanism that opens or closes a flow path of the forming material, the flow path being connected to the nozzle; and
      a moving mechanism that changes a relative position between the forming table and the nozzle;
   a memory configured to store a program; and
   a processor configured to execute the program so as to:
      generate path data including information corresponding to each of a plurality of paths indicating a relative movement direction and a movement distance of the nozzle with respect to the forming table and a discharge parameter indicating discharging of the forming material, the plurality of paths including a first path and a second path that is traced after the first path by the nozzle, the processor controlling the three-dimensional forming apparatus based on the path data;

determine whether the moving distance of the second path is equal to or more than a first threshold value;

determine whether an angle between the first path and the second path is equal to or more than a second threshold value;

add an opening/closing command for driving the opening/closing mechanism between a first area of the path data corresponding to the first path and a second area of the path data corresponding to the second path when the processor determines that the moving distance of the second path is equal to or more than the first threshold value and that the angle between the first path and the second path is less than the second threshold value;

generate forming data when the processor added the opening/closing command to the path data; and cause the three-dimensional forming apparatus to operate based on the generated form data.

2. The three-dimensional forming system according to claim 1,
wherein the processor is configured to generate the path data from original data representing a shape of a three-dimensional formed object.

3. The three-dimensional forming system according to claim 1,
wherein the processor is further configured to:
acquire a moving speed of the nozzle when the nozzle is moved while discharging the forming material;
determine whether the acquired moving speed of the nozzle is equal to or more than a third threshold value when the nozzle trances the first path; and
add the opening/closing command for driving the opening/closing mechanism between the first area of the path data corresponding to the first path and the second area of the path data corresponding to the second path when the processor determines that the acquired moving speed is equal to or more than the third threshold value.

4. The three-dimensional forming system according to claim 1,
wherein the three-dimensional forming apparatus further includes a forming material generator, and the forming material generator has a flat screw, and
the forming material generator is configured to generate the forming material by melting at least a portion of an original material supplied to the flat screw by rotating the flat screw, and the forming material generator is configured to guide the generated forming material to the nozzle.

5. A data generating apparatus that is connectable to a three-dimensional forming apparatus, the three-dimensional forming apparatus including:
a nozzle that discharges forming material toward a forming table;
an opening/closing mechanism that opens or closes a flow path of the forming material, the flow path being connected to the nozzle; and
a moving mechanism that changes a relative position between the forming table and the nozzle, the data generating apparatus comprising:
a memory configured to store a program; and
a processor configured to execute the program so as to:

generate path data including information corresponding to each of a plurality of paths indicating a relative movement direction and a movement distance of the nozzle with respect to the forming table and a discharge parameter indicating discharging of the forming material, the plurality of paths including a first path and a second path that is traced after the first path by the nozzle, the processor controlling the three-dimensional forming apparatus based on the path data;

determine whether the moving distance of the second path is equal to or more than a first threshold value;

determine whether an angle between the first path and the second path is equal to or more than a second threshold value;

add an opening/closing command for driving the opening/closing mechanism between a first area of the path data corresponding to the first path and a second area of the path data corresponding to the second path when the processor determines that the moving distance of the second path is equal to or more than the first threshold value and that the angle between the first path and the second path is less than the second threshold value;

generate forming data when the processor added the opening/closing command to the path data; and cause the three-dimensional forming apparatus to operate based on the generated form data.

6. A method for causing a processor to execute a process to generate forming data to be input to a three-dimensional forming apparatus, the three-dimensional forming apparatus including:
a nozzle that discharges forming material toward a forming table;
an opening/closing mechanism that opens or closes a flow path of the forming material, the flow path being connected to the nozzle; and
a moving mechanism that changes a relative position between the forming table and the nozzle, the method comprising executing on the processor the steps of:
generating path data including information corresponding to each of a plurality of paths indicating a relative movement direction and a movement distance of the nozzle with respect to the forming table and a discharge parameter indicating discharging of the forming material, the plurality of paths including a first path and a second path that is traced after the first path by the nozzle, the processor controlling the three-dimensional forming apparatus based on the path data;
determining whether the moving distance of the second path is equal to or more than a first threshold value;
determining whether an angle between the first path and the second path is equal to or more than a second threshold value;
adding an opening/closing command for driving the opening/closing mechanism between a first area of the path data corresponding to the first path and a second area of the path data corresponding to the second path when the processor determines that the moving distance of the second path is equal to or more than the first threshold value and that the angle between the first path and the second path is less than the second threshold value;
generating the forming data when the processor added the opening/closing command to the path data; and
causing the three-dimensional forming apparatus to operate based on the generated form data.

7. A computer program product embodying a program stored on a non-transitory computer-readable medium for causing a computer to execute a process by a processor so as to generate forming data to be input to a three-dimensional forming apparatus, the three-dimensional forming apparatus including:
- a nozzle that discharges forming material toward a forming table;
- an opening/closing mechanism that opens or closes a flow path of the forming material, the flow path being connected to the nozzle; and
- a moving mechanism that changes a relative position between the forming table and the nozzle, and a control unit that controls the opening/closing mechanism and the moving mechanism according to the forming data, and to perform the steps of:
- generating path data including information corresponding to each of a plurality of paths indicating a relative movement direction and a movement distance of the nozzle with respect to the forming table and a discharge parameter indicating discharging of the forming material, the plurality of paths including a first path and a second path that is traced after the first path by the nozzle, the processor controlling the three-dimensional forming apparatus based on the path data;
- determining whether the moving distance of the second path is equal to or more than a first threshold value;
- determining whether an angle between the first path and the second path is equal to or more than a second threshold value;
- adding an opening/closing command for driving the opening/closing mechanism between a first area of the path data corresponding to the first path and a second area of the path data corresponding to the second path when the processor determines that the moving distance of the second path is equal to or more than the first threshold value and that the angle between the first path and the second path is less than the second threshold value;
- generating the forming data when the processor added the opening/closing command to the path data; and
- causing the three-dimensional forming apparatus to operate based on the generated form data.

* * * * *